United States Patent [19]
Schwartz et al.

[11] Patent Number: 5,575,493
[45] Date of Patent: *Nov. 19, 1996

[54] LIFTING MECHANISM FOR WHEELED APPARATUS

[76] Inventors: Charlie E. Schwartz, 1802 N. Llano, Junction, Tex. 76849; John R. Kyburz, 10412 Pleasant Mound, Fort Worth, Tex. 76108

[*] Notice: The term of this patent shall not extend beyond the expiration date of Pat. No. 5,401,046.

[21] Appl. No.: 411,434

[22] Filed: Mar. 27, 1995

Related U.S. Application Data

[63] Continuation of Ser. No. 190,907, Feb. 1, 1994, Pat. No. 5,401,046.

[51] Int. Cl.⁶ ....................................... B60S 9/10
[52] U.S. Cl. ................... 280/475; 280/763.1; 280/766.1; 254/423
[58] Field of Search ................................ 280/402, 405.1, 280/417.1, 422, 425.1, 425.2, 427, 429, 764.1, 765.1, 766.1, 475; 254/418, 419, 423, 93 VA

[56] References Cited

U.S. PATENT DOCUMENTS

| | | | |
|---|---|---|---|
| 2,660,679 | 11/1953 | Hunt | 280/422 |
| 3,431,727 | 3/1969 | Grumman | 60/52 |
| 3,627,268 | 12/1971 | Wills | 254/423 |
| 3,819,076 | 6/1974 | Oehler | 280/425.1 |
| 3,840,252 | 10/1974 | Jocoy | 280/417.1 |
| 3,915,476 | 10/1975 | Burkle | 280/422 |
| 4,113,274 | 9/1978 | Vahrenkamp | 280/475 |
| 4,235,542 | 11/1980 | Paterik | 254/423 |
| 5,125,679 | 6/1992 | Delano | 280/425.2 |
| 5,401,046 | 3/1995 | Schwartz et al. | 280/425.1 |

FOREIGN PATENT DOCUMENTS 0701072  1/1965  Canada ............................... 280/425.1

Primary Examiner—Anne Marie Boehler
Attorney, Agent, or Firm—Robert A. Felsman; Mark D. Perdue

[57] ABSTRACT

A trailer with wheels located near its rearward end and a connecting arm extending from a mid-region of the forward end of the trailer. The connecting arm includes a gooseneck with a ball receptacle to connect with a ball protruding upwardly from the truck bed. A shroud is connected to the forward end of the trailer beneath the connecting arm and a powered hydraulic cylinder is carried inside the shroud and includes a rod extending downwardly to raise and lower the front of the trailer. A stabilizer arm terminating in a foot portion is carried by the shroud to extend downwardly and co-extensively with the rod to protect the hydraulic cylinder and rod from loading other than by the weight of the trailer and its load.

12 Claims, 5 Drawing Sheets

LIFTING MECHANISM FOR WHEELED APPARATUS

Application is a continuation, of application Ser. No. 08/190,907 filed Feb. 1, 1984 now Pat. No. 5,401,041.

BACKGROUND OF THE INVENTION

1. Field of the Invention

The present invention relates generally to an improved trailers and lifting mechanisms having improved reliability and safety features. More specifically, the invention relates to an improved lifting mechanisms for use with gooseneck trailers.

2. Background Information

Gooseneck trailers commonly are employed in conjunction with heavy-duty pickup trucks to transport livestock and other cargos. Such gooseneck trailers are provided with wheels at the rearward end and a connecting arm extending from a mid-region of the forward end of the trailer. The connecting arm includes a gooseneck portion with a ball receptacle to connect with a ball protruding upwardly from the truck bed. The ball and ball receptacle provide a means of connecting the trailer to the truck.

Because gooseneck trailers have wheels only at their rearward end, the trailer must be provided with some means of supporting the front end of the trailer when the trailer is coupled or uncoupled from the truck. Conventionally, a manually operated jack stand is provided at the front of the trailer to perform this function. Such manually operated jack stands typically are provided with a manual crank arrangement and locking pin that is manually operated to extend and retract the jack relative to the trailer and to lock the jack in an extended or retracted position. This manually operated jack requires excessive physical effort to move the manual crank, which is in a dangerous location. It is sometimes necessary to lift the trailer when loaded with cattle or other heavy cargo, which increases the required physical effort and risk to the operator.

U.S. Pat. No. 5,125,679, Jun. 30, 1992 to Delano discloses such a jack stand that is mounted to the trailer to rotate in and out of a vertical position. Such manual jacks expose the operator to risk and require substantial physical strength for operation, particularly when a trailer is loaded with upward of 20,000 pounds of cargo. Also, manual operation requires the operator be in close proximity to the rear of the truck and under at least a portion of the trailer to operate the jack stand during coupling and uncoupling operations. Such manual operation can be very dangerous to the operator.

A number of prior-art references disclose lifts or leveling apparatuses for use with towed vehicles. U.S. Pat. No. 4,928,488, May 29, 1990, to Hunger discloses an hydraulic support device for semi-trailers. Hunger's lift employs three separate pumps to accomplish extension, retraction, and load raising functions. Such a support device is overly complicated and is not easily adapted for use with a gooseneck trailer, in which the hydraulic cylinders are subject to damage from the rear bumper of the towing vehicle. U.S. Pat. No. 4,235,542, Nov. 25, 1980, to Paterik, Jr. discloses a self-stowing vehicle leveling jack. In that disclosure the structural components of the jack form the hydraulic cylinder itself, and the motor, pump, and hydraulic control circuit are all contained within the hydraulic ram assembly. Again, such a jack is overly complicated and is susceptible to damage in a gooseneck trailer application.

U.S. Pat. No. 4,113,274, Sept. 12, 1978, to Vahrenkamp discloses a pneumatic jack assembly employed on the tongue of single-axle trailer. Such a pneumatic jack generally is not capable of generating the lifting forces necessary to raise and lower a fully loaded gooseneck trailer. Also, a pneumatic jack requires a heavy and cumbersome air compressor for operation. U.S. Pat. No. 3,431,727, Mar. 11, 1969 to Grumman discloses a jack arrangement for trailers including an electrically driven piston pump, which communicates with three leveling jacks to accomplish leveling of a house trailer. Again, such an arrangement is complicated and is not adapted for use with a gooseneck trailer.

A need exists, therefore, for a trailer with an improved lifting mechanism for connecting a gooseneck trailer to a truck bed that is protected from loading other than by the weight of the trailer and is protected from damage by impact from the bumper or other portion of the towing vehicle during coupling operations. Furthermore, a need exists for an improved lifting mechanism with a remote control to permit an operator to control the lifting mechanism while viewing its operation from a safe distance from the truck, trailer, and lifting mechanism.

SUMMARY OF THE INVENTION

It is a general object of the present invention to provide an improved trailer with a lifting mechanism for connecting a gooseneck trailer to a truck bed in a safe and exertion-free manner.

This and other objects of the present invention are accomplished by providing a trailer with wheels located near its rearward end and a connecting arm extending from a mid-region of the forward end of the trailer. The connecting arm includes a gooseneck with a ball receptacle to connect with a ball protruding upwardly from the truck bed. A shroud is connected to the forward end of the trailer beneath the connecting arm and a powered hydraulic cylinder is carried inside the shroud and includes a rod extending downwardly to raise and lower the front of the trailer. A stabilizer arm terminating in a foot portion is carried by the shroud to extend downwardly and co-extensively with the rod to protect the hydraulic cylinder and rod from loading other than by the weight of the trailer and its load.

According to a preferred embodiment of the present invention, the stabilizer arm is disposed forward of the cylinder and rod to protect them against impact from a portion of the truck or towing vehicle.

According to a preferred embodiment of the present invention, the lifting mechanism includes remote control means coupled to the cylinder to permit an operator to control the lifting mechanism while viewing its operation from a safe distance from the truck, trailer, and lifting mechanism.

DESCRIPTION OF THE PREFERRED EMBODIMENT

Figure 1:
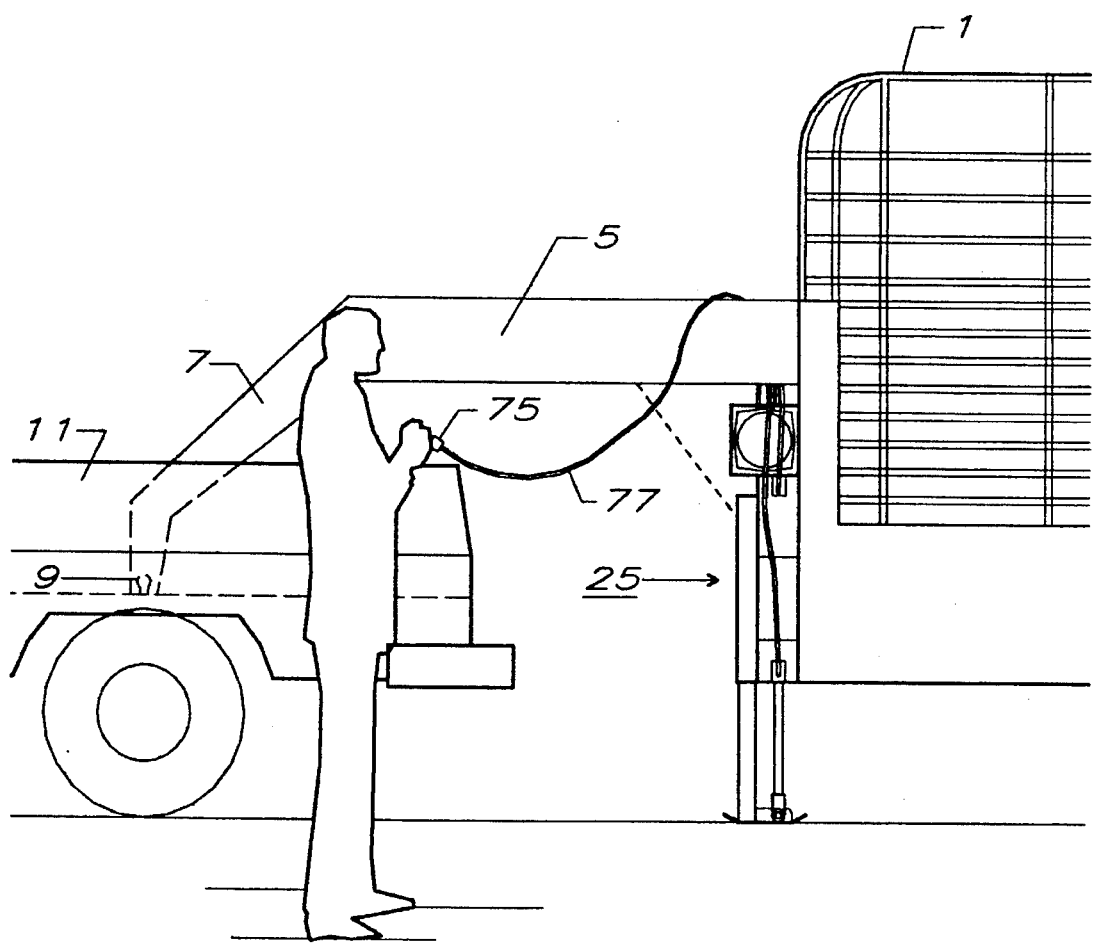
FIG. 1 is a partial elevation view of a truck and gooseneck trailer, the trailer including the improved lifting mechanism according to the present invention.
Figure 2:
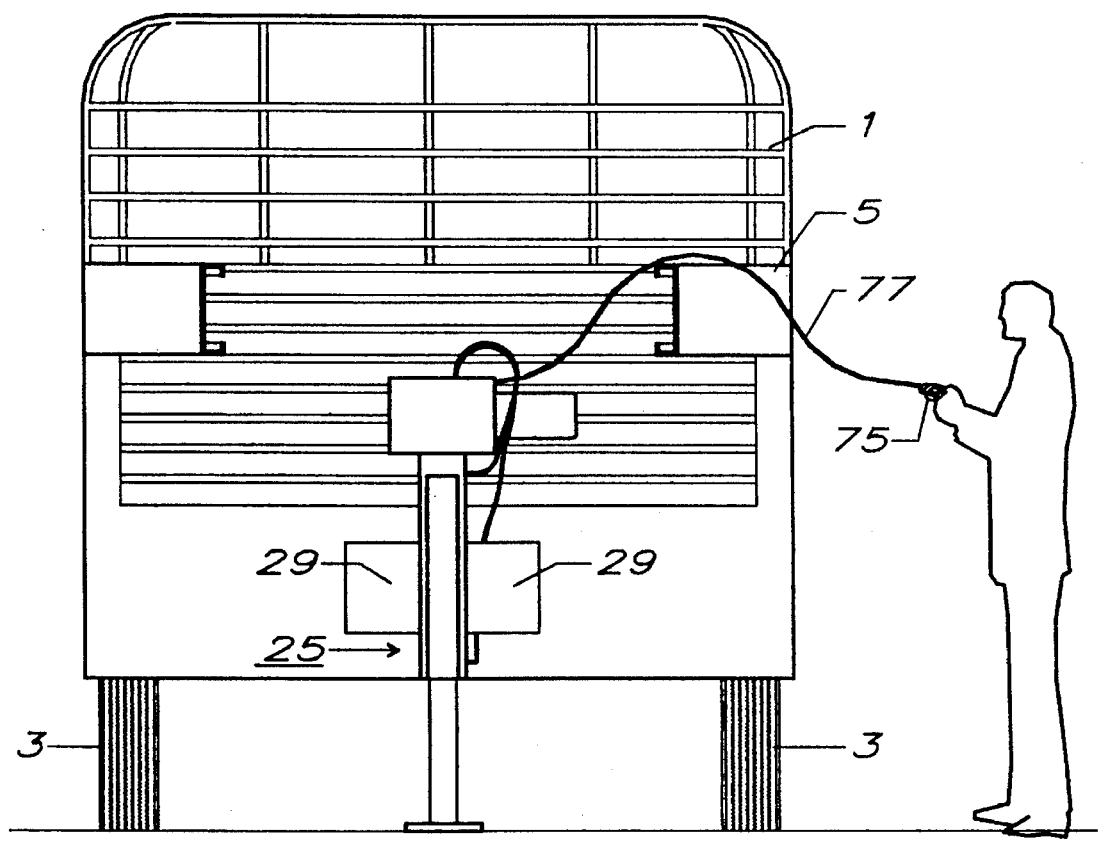
FIG. 2 is an end elevation view of the forward portion of the trailer of FIG 1.

Referring now to FIGS. 1 and 2, a trailer 1 according to the present invention is illustrated. Trailer 1 includes at least a pair of wheels 3 at its rearmost end. A connecting arm 5 extends from a mid-region of the forward wall of trailer 1. Connecting arms includes a gooseneck portion 7, which terminates in a ball receptacle for receiving a ball 9 protruding upwardly from the bed of truck 11. Such a trailer 1 thus commonly is referred to as a "gooseneck trailer". A lifting mechanism 25 according to the present invention is secured to the front wall of trailer 1 beneath connecting arm 5.

Figures 3, 4:
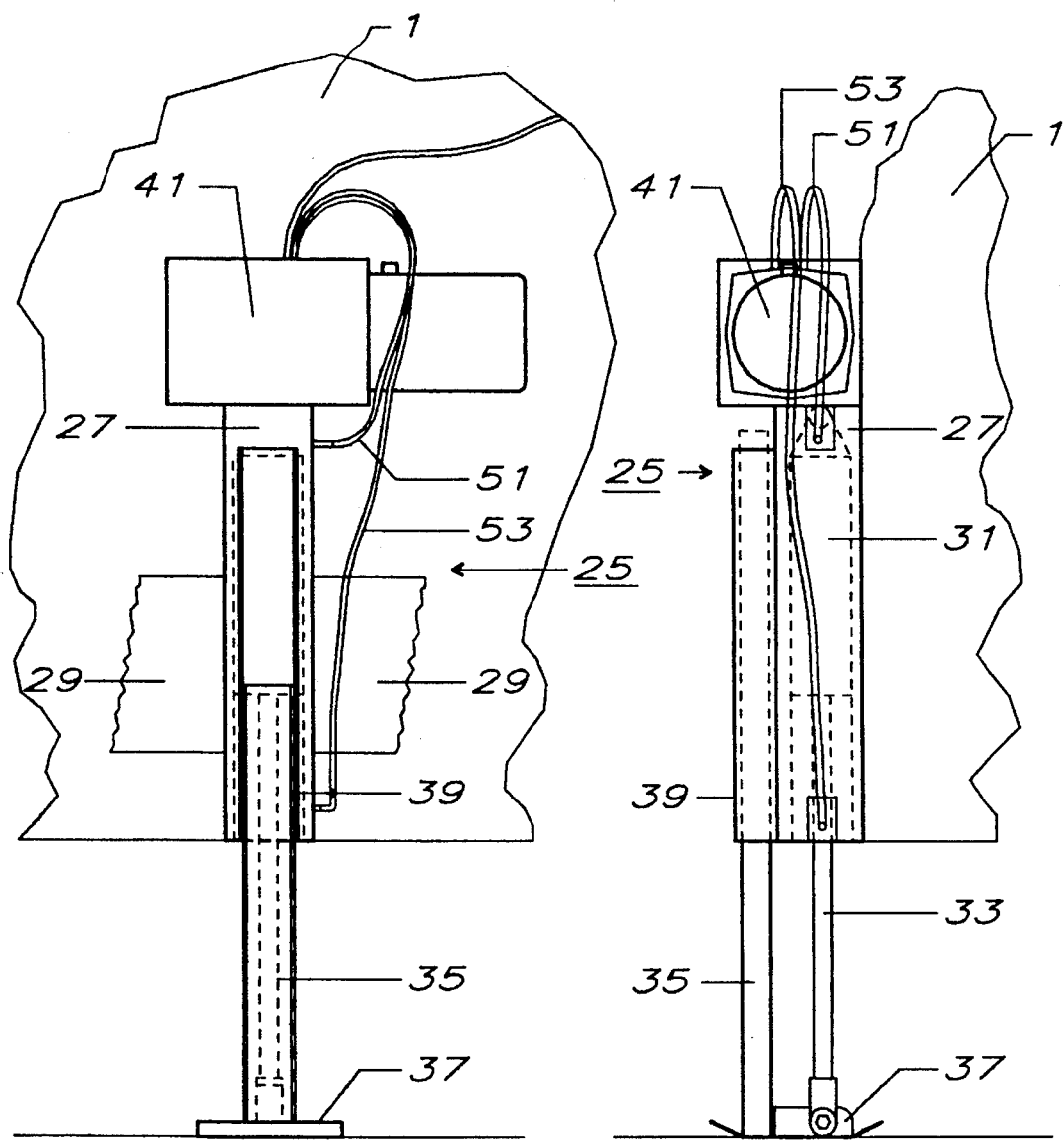
FIG. 3 is a partial elevation view of the lifting mechanism according to the present invention.
FIG. 4 is a side elevation view of the lifting mechanism depicted in FIG. 3.

Figures 3 and 4 are enlarged elevation views of lifting mechanism 25. Lifting mechanism 25 comprises a shroud 27, which preferably is formed of steel tubing that is square in cross-section. Shroud 27 preferably is secured to front wall of trailer 1 by welding and is provided with a pair of reinforcing plates 29 welded to the front wall of trailer 1 and extending to the front wall of shroud 27. A double-acting cylinder hydraulic 31 (shown in phantom) is carried within shroud 27 and includes a downwardly extending and reciprocating rod 33.

A stabilizer arm 35, which terminates in a foot portion 37 adapted for engagement with the ground, is carried by shroud 27, preferably forward of rod 33 and cylinder 31. Stabilizer arm 35 is provided to prevent cylinder and rod 33 from experiencing impact or lateral loading and the like, which could bend rod 33, damage seals in cylinder 31, or otherwise render hydraulic cylinder 31 and rod 33 inoperable or damaged. According to a preferred embodiment of the present invention, stabilizer arm 35 is placed forward of rod 33 and cylinder 31 to protect them from damage resulting from impact by the rear bumper or another portion of truck 11 or other towing vehicle while coupling and uncoupling with trailer 1. Stabilizer arm 35 is telescopically received in stabilizer arm sleeve 39, both of which preferably are formed of steel tubing that is square in cross-section. Stabilizing arm sleeve 39 preferably is welded to the front portion of shroud 27.

A powered hydraulic pump assembly 41 is carried exteriorly and at the uppermost end of shroud 27. Hydraulic pump assembly 41 is in fluid communication with and provides pressurized fluid to cylinder 31 for the selective downward extension and upward retraction of rod 33, stabilizer arm 35, and foot portion 37 relative to trailer to accomplish lifting thereof.

Figure 5:
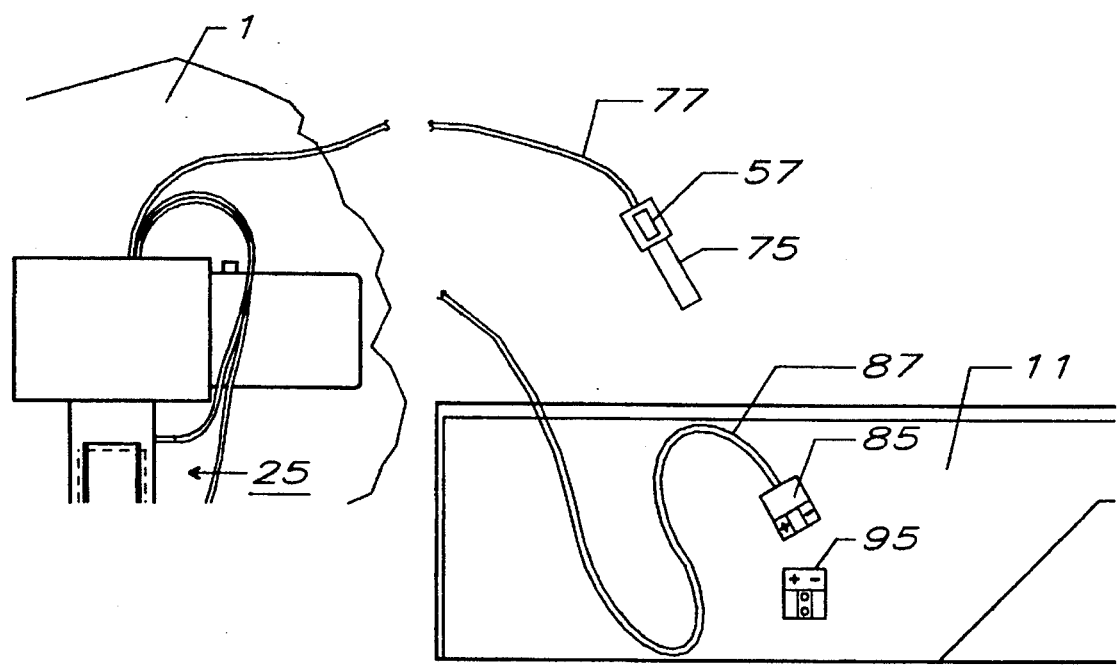
FIG. 5 is an elevation view of the remote control means and detachable electrical coupling for use with the lifting mechanism according to the present invention.

As illustrated in FIGS. 1, 2, and 5, a remote control means 75 is coupled by a cable 77 to lifting mechanism 25 to permit an operator to control lifting mechanism 25 while viewing its operation from a safe distance from truck 1, trailer 5, and lifting apparatus 25. An electrical power jack 95 is disposed in the bed of truck 1 and is coupled to the electrical system of truck 1 to provide electrical power to powered hydraulic pump 41. Pump assembly 41 is coupled to jack 95 through a detachable electrical plug 85 and an electrical cable 87. This arrangement permits trailer 1 and lifting mechanism 25 to be coupled and uncoupled rapidly from truck 1 and its electrical power supply.

Figure 6:
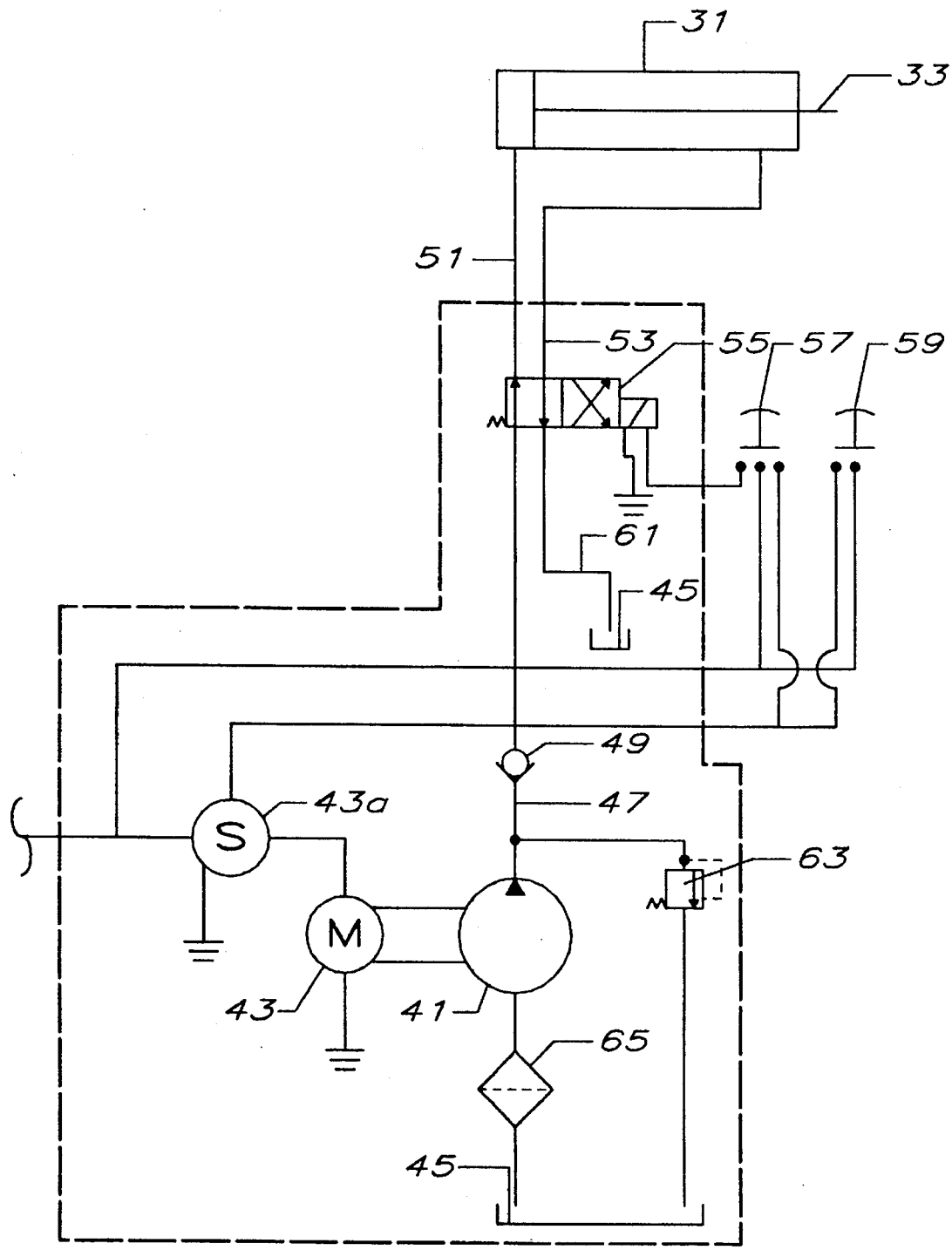
FIG. 6 is a schematic representation of the hydraulic control circuit employed by the lifting mechanism according to the present invention.

FIG. 6 is a schematic representation of the hydraulic control circuit employed in lifting mechanism 25 according to the present invention. The hydraulic control circuit comprises an hydraulic pump 41, which is driven by an electric motor 43 provided with a conventional starter 43a. Hydraulic pump 41 is in fluid communication with an hydraulic fluid reservoir 45 and a fluid pressure supply conduit 47. A check valve 49 is provided in pressure supply conduit 47 to prevent return of fluid to pump 41.

Pressure supply conduit 47 is in fluid communication with either a rod extension conduit 51 or a rod retraction conduit 53 through solenoid-activated bi-directional valve 55. Rod extension conduit 51 is in fluid communication with one end of hydraulic cylinder 31 and rod retraction conduit 53 is in fluid communication with an opposite end of cylinder 31.

Bi-directional valve 55 is controlled by an single-pole double-throw electrical switch 57, which is coupled to the power supply of truck 1 through a single-pole single-throw power switch 59. Activation of switch 57 causes bi-directional valve 55 to move between one of two positions: a position in which pump 41 and pressure supply conduit 47 are in fluid communication with rod extension conduit 51 and cylinder 31 and rod retraction conduit 53 is in fluid communication with fluid reservoir 45 through fluid return conduit 61; and another position in which pump 41 and pressure supply conduit 47 are in fluid communication with rod retraction conduit 53 and cylinder 31 and rod extension conduit 51 is in fluid communication with fluid reservoir 45 through fluid return conduit 61.

Upon activation of switch 57 to move valve 55 to either position, electrical power is supplied to motor 43, which drives pump 41 to provide pressurized fluid from pump 41 to cylinder 31 through pressure supply conduit 47 and either rod extension conduit 51 or rod retraction conduit 53. Depending on which of rod extension and rod retraction conduits 51, 53 is coupled with pressure supply conduit 47, rod 33 and stabilizer arm 35 are either extended downwardly to lift trailer 1 or retracted upwardly to lower trailer 1.

Check valve 49 prevents pressurized fluid from exiting cylinder 31 and thus maintains rod 33 and stabilizer arm 35 in the selected extended or retracted position.

A pressure relief valve 63 is provided between pump 41 and reservoir 45 to prevent over-pressurization of any of the components of the hydraulic control circuit. Pressure relief valve 63 also provides a means for dictating the capacity of lifting mechanism 25 in that the lifting capacity will naturally be limited by the cracking pressure of valve 63. An hydraulic fluid strainer 65 is further provided between pump 41 and reservoir 45 to prevent debris and foreign matter in the fluid from damaging pump 41.

With reference now to FIGS. 1–6, the operation of the present invention will be described. At some point during operation of trailer 1, usually when coupling and uncoupling to truck 11 or other towing vehicle, it becomes necessary to alter the distance of gooseneck 7 relative to the ground. Assuming truck 11 is to be coupled to trailer 1, truck 11 first is positioned sufficiently closely to truck 11 to permit connection of electrical power plug 85 to electrical power jack 95 in the bed of truck 11 to supply electrical power to lifting mechanism 25. Next, switch 57 is activated to raise trailer 1. Cylinder 31 is placed in fluid communication with pump 41 through pressure supply conduit 47, bi-directional valve 55, and rod extension conduit 51. Thus, rod 33 and stabilizer arm 25 are extended downwardly from trailer, raising gooseneck 7 relative to the bed of truck 11. Truck 11 then is positioned with ball 9 under the ball receptacle of gooseneck 7, and is lowered into engagement with ball 9 by retracting rod 33 and stabilizer arm 35 relative to trailer 1.

To accomplish this lowering, switch 57 is manipulated in a reverse direction, which activates bi-directional valve 55. Pump 41 is placed in fluid communication with cylinder 31 through pressure supply conduit 47, bi-directional valve 55, and rod retraction conduit 53 and rod 33 and stabilizer 35 are retracted relative to trailer 1 lowering gooseneck 7 into engagement with ball 9.

The foregoing procedure is essentially reversed to uncouple truck 11 from trailer 1. Lifting mechanism 25 serves as a jack stand when truck 11 is uncoupled from trailer 1. Check valve 49 in pressure supply conduit 47 prevents fluid from escaping cylinder 31 and maintains rod 33 and stabilizer arm 35 in the selected extended or retracted position. All operations of lifting mechanism 25 are conducted within view of trailer 1, truck 11 and lifting mechanism 25, but at a safe distance away, using hand-held controller 75 on cable 77.

A principal advantage of the lifting mechanism according to the present invention is that is more safely and easily operated than prior-art lifting devices. The stabilizer arm and shroud protect the components of the lifting mechanism from damage due to transverse or lateral loads other than from the weight of the trailer. Additionally, provision of the stabilizer forward of the cylinder and rod protect the cylinder and rod from damage due to impact from the rear bumper or other portion of the towing vehicle.

The invention has been described with reference to preferred embodiments thereof. Those skilled in the art will appreciate that the invention is thus not limited, but is susceptible to modification and variation without departing from the scope and spirit thereof.

We claim:

1. A lifting mechanism for use with a wheeled apparatus adapted to be towed by a vehicle, the lifting mechanism comprising:

a shroud connected to a portion of the wheeled apparatus;

a powered hydraulic cylinder carried inside the shroud, with a rod extending reciprocatingly downwardly to raise and lower the wheeled apparatus;

a stabilizer arm terminating at its lower end in a foot portion, the stabilizer arm carried by the shroud to extend downwardly and coextensively with the rod to protect the hydraulic cylinder from loading other than by the weight of the wheeled apparatus and its load;

an hydraulic pump carried by the shroud;

a solenoid-activated bi-directional valve coupled to a pressure supply conduit in fluid communication with the pump;

a rod extension conduit in fluid communication between the bi-directional valve and the cylinder;

a rod retraction conduit in fluid communication between the bi-directional valve and the cylinder;

a check valve in the pressure supply conduit to prevent fluid return to the pump through the pressure supply conduit; and a pressure relief valve in the pressure supply conduit to prevent overpressurization of the lifting mechanism wherein the bi-directional valve selectively couples the pressure supply conduit with one of the extension and retraction conduits to provide fluid pressure from the pump to the cylinder to selectively downwardly extend and upwardly retract the rod and stabilizer arm.

2. The lifting mechanism of claim 1 further including remote control means coupled to the cylinder to permit an operator to control the lifting mechanism while viewing its operation from a safe distance from the lifting mechanism.

3. The lifting mechanism of claim further including:

an electric motor carried by the shroud;

an hydraulic pump carried by the shroud and coupled to the cylinder to provide pressurized fluid to the cylinder for selective downward extension and upward retraction of the rod and stabilizer arm.

4. The lifting mechanism of claim 3 further comprising:

an electrical power jack carried by the vehicle, the jack coupled to the vehicle's electrical supply; and a detachable electrical power plug coupled to the motor for supply of electrical power, the power plug being selectively attachable to the jack.

5. The lifting mechanism of claim 1 wherein the stabilizer arm is forward of the rod and cylinder to protect the rod and cylinder from impact.

6. A lifting mechanism for a wheeled apparatus adapted to be towed by a vehicle, the lifting mechanism comprising:

a shroud connected to a portion of the wheeled apparatus;

an hydraulic cylinder carried inside the shroud, with a rod extending reciprocatingly downwardly to raise and lower the front of the wheeled apparatus;

a stabilizer arm terminating at its lower end in a foot portion, the stabilizer arm carried by the shroud to extend downwardly and coextensively with the rod foot to protect the hydraulic cylinder;

a powered hydraulic pump in fluid communication with the cylinder and carried by the shroud;

remote control means coupled to the pump to permit an operator to control the lifting mechanism while viewing operation from a safe distance from the lifting mechanism;

a solenoid-activated bi-directional valve coupled to a pressure supply conduit in fluid communication with the pump;

a rod extension conduit in fluid communication between the bi-directional valve and the cylinder;

a rod retraction conduit in fluid communication between the bi-directional valve and the cylinder;

a check valve in the pressure supply conduit to prevent fluid return to the pump through the pressure supply conduit; and a pressure relief valve in the pressure supply conduit to prevent overpressurization of the lifting mechanism, wherein the bi-directional valve selectively couples the pressure supply conduit with one of the extension and retraction conduits to provide fluid pressure from the pump to the cylinder to selectively downwardly extend and upwardly retract the rod and stabilizer arm.

7. The lifting mechanism of claim 6 wherein the remote control means further comprises:

a single-pole double throw electrical switch;

at least one cable coupling the single-pole double-throw switch to a motor driving the pump and to the bi-directional valve, the cable having a length selected to permit an operator to view operation from a safe distance.

8. The lifting mechanism of claims 6 wherein the stabilizer arm is forward of the rod and cylinder to protect the rod and cylinder from impact.

9. The lifting mechanism of claim 6 further comprising:

an electrical power jack carried by the vehicle, the jack coupled to the vehicle's electrical supply; and a detachable electrical power plug coupled to the powered hydraulic pump for supply of electrical power, the power plug being selectively attachable to the jack.

10. The lifting mechanism of claim 9 wherein said remote control means comprises:

a single-pole double throw electrical switch, the switch carried by a hand-held housing;

at least one cable coupling the housing and single-pole double-throw switch to the motor and to the bi-directional valve, the cable having a length selected to permit an operator to view operation from a safe distance.

11. A lifting mechanism for a wheeled apparatus adapted to be towed by a vehicle, the lifting mechanism comprising:

a shroud connected to a portion of the wheeled apparatus;

an hydraulic cylinder carried inside the shroud, with a rod extending reciprocatingly downwardly to raise and lower the front of the wheeled apparatus;

a pump carried by the shroud and in fluid communication with the cylinder through an hydraulic control circuit;

an electric motor carried by the shroud and driving the pump;

a stabilizer arm terminating at its lower end in a foot portion, the stabilizer arm carried by the shroud forward of the cylinder and rod to extend downwardly and coextensively with the rod to the foot to protect the hydraulic cylinder from loading other than by the wheeled apparatus;

a solenoid-activated bi-directional valve coupled to a pressure supply conduit in fluid communication with the pump;

a rod extension conduit in fluid communication between the bi-directional valve and the cylinder;

a rod retraction conduit in fluid communication between the bi-directional valve and the cylinder;

a check valve in the pressure supply conduit to prevent fluid return to the pump through the pressure supply conduit; and a pressure relief valve in the pressure supply conduit to prevent overpressurization of the lifting mechanism, wherein the bi-directional valve selectively couples the pressure supply conduit with one of the extension and retraction conduits to provide fluid pressure from the pump to the cylinder to selectively downwardly extend and upwardly retract the rod and stabilizer arm.

12. The lifting mechanism of claim 11 further comprising:

an electrical power jack carried by the vehicle the jack coupled to the vehicle's electrical supply; and a detachable electrical power plug coupled to the motor for supply of electrical power, the power plug being selectively attachable to the jack.

* * * * *